United States Patent [19]
Kaufman et al.

[11] 3,895,865
[45] July 22, 1975

[54] HIGH SPEED MICROFILM SEARCHING SYSTEM

[75] Inventors: Burton Kaufman, New York; Bruce H. Schneider, Forest Hills, both of N.Y.

[73] Assignee: General Computing Corporation, New York, N.Y.

[22] Filed: Feb. 11, 1974

[21] Appl. No.: 441,049

[52] U.S. Cl. ............... 353/26; 352/104; 315/149; 315/84.5
[51] Int. Cl.² ............... G03B 21/10; G03B 25/00
[58] Field of Search ....... 353/26; 352/104; 315/149, 315/84.5

[56] References Cited
UNITED STATES PATENTS
2,473,625  6/1949  Wheeler.............................. 356/23
3,597,070  8/1971  Slettebo.............................. 353/26

Primary Examiner—Richard E. Aegerter
Assistant Examiner—Larry Jones
Attorney, Agent, or Firm—S. C. Yuter

[57] ABSTRACT

A high speed microfilm searching system is disclosed. The system optically displays frames of the microfilm. A frame of microfilm is made up of a sensor mark, a page of information and an index code. The index code is a meaningful alphanumeric or numeric key that accompanies each page of data. If it is alphabetic it varies in strict alphabetic sequence. If the components of the key are numeric they vary in a monotonically increasing or decreasing order. Microfilm projecting means mounted in the film path between feed and take-up reels clearly display on a viewing screen a page of information when the microfilm is stationary in accordance with existing technology. The high speed search system is new technology. A strobe lamp displays indexes of the moving microfilm on a screen. Each of the frames having an index also has an optically detectable marker. Electronic control means is optically responsive to each marker to generate a marker signal which can trigger the strobe and display the index of that page, like a movie picture. At very low microfilm retrieval speeds each character of the index is legible so that all of the characters of the index can be read by the user. At increasingly higher retrieval speeds only more significant characters can be read because of the rapid change of the low order characters. At the increasingly higher speeds the electronic control means is only responsive to every second, third, fourth, etc. marker signal. As the desired index comes into range, whether going forward or backward, the viewer operator slows the speed of the microfilm so that more of the characters of the index can be read. When the desired index is very close, the film is moved very slowly so that all of the characters of each index can be read. The film is then stopped on the desired frame so that the contents of the page can be read on the viewing screen.

17 Claims, 4 Drawing Figures

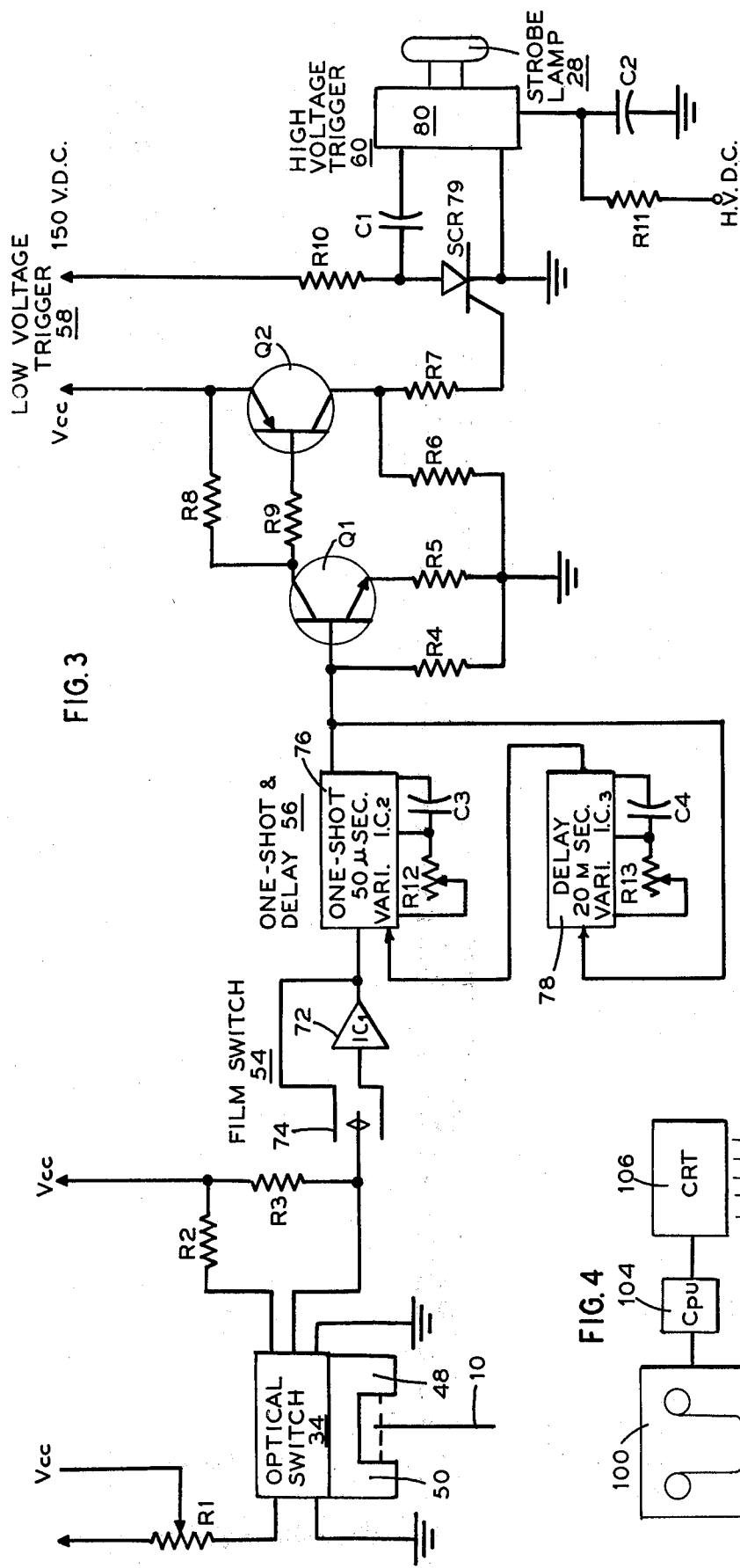

HIGH SPEED MICROFILM SEARCHING SYSTEM

This invention relates to high speed retrieval from microfilm and particularly to a system for uniquely indexing microfilm and retrieving that indexed microfilm.

The use of microfilm is widespread and conventional for purposes of preserving large quantities of information, whether generated by photographing documents or computer generated as digital data to be recorded on the film directly. The conventional method of reading microfilm is to employ a reading apparatus in the form of an optical projector, operated manually or electrically, wherein the film is advanced past a projection mechanism for viewing on a screen. Since reels of microfilm may contain many thousands of frames, the amount of time necessary to retrieve any individual frame becomes inconveniently large when accomplished by direct viewing.

In direct view retrieval, the images are advanced past the viewing apparatus at a rate faster than the eye can absorb, thus showing only a blur of light. When the approximate area of retrieval is reached, the film must be slowed to a speed enabling the operator to view a reference to determine if the required frame has been reached. Since this process is inexact, starting, slowing and stopping of the film must be repeated several times to provide the proper frame position.

It is therefore the principal object of the invention to provide a novel and unique apparatus for projecting a continuous display of microfilm indexing information while the film is in motion.

It is a further object of the present invention to provide a novel and unique indexing system which will enable a user to locate a desired frame of microfilm while the film is kept in motion.

It is another object of the invention to provide a novel and unique electrically actuatable system for projecting a continuous display of microfilm frame indexing information while the film is moving at relatively high speeds.

It is a still further object of the invention to provide a method for recording information by frames on a reel of microfilm with a unique identifying frame index recorded on the appropriate frame.

The foregoing objects are realized by a system including an optical sensor responsive to a marker, positioned relative to each frame on a reel of microfilm, for generating a strobe pulse resulting in a strobe flash. The flash is thus synchronized with a frame for illuminating an index number recorded on the frame. In operation, as the desired index code is approached the film movement is slowed so that additional low order digits of the index number become legible. The film is stopped when the precise frame desired is reached.

By rapidly transmitting short bursts of light synchronized with the centering of moving frames the changing index takes on the appearance of a movie picture. Thus the strobe serves as a replacement of a more conventional means of alternately blocking and transmitting light to effect animation from a film strip. This concept lends itself especially to the retrieval of data organized systematically on microfilm since in this case the paramount need to search the film at extremely high speeds makes impractical conventional techniques which rely solely on sprocketed film mechanically actuating shutters or prisms. The system being of an electrical optical nature permits the retrieval from film moving at a rate far in excess of that which would be practical with conventional sprocketed movie film. The only constraint on the rate of retrieval under the disclosed system would be the power of the motor moving the film or, if utilized with manual feed, the speed with which one could turn a crank.

The frame index is originally recorded when the frame data is recorded by optically projecting the index code corresponding to the frame onto the unexposed film.

The foregoing objects and brief description of the invention will become more apparent from the following more detailed description and appended drawings, wherein:

FIG. 3 is a detailed circuit diagram of the block diagram of FIG. 2; and

FIG. 4 is a block diagram of a recording system for recording the indexes on the frames together with correctly located markers and frame data.

Figure 1:
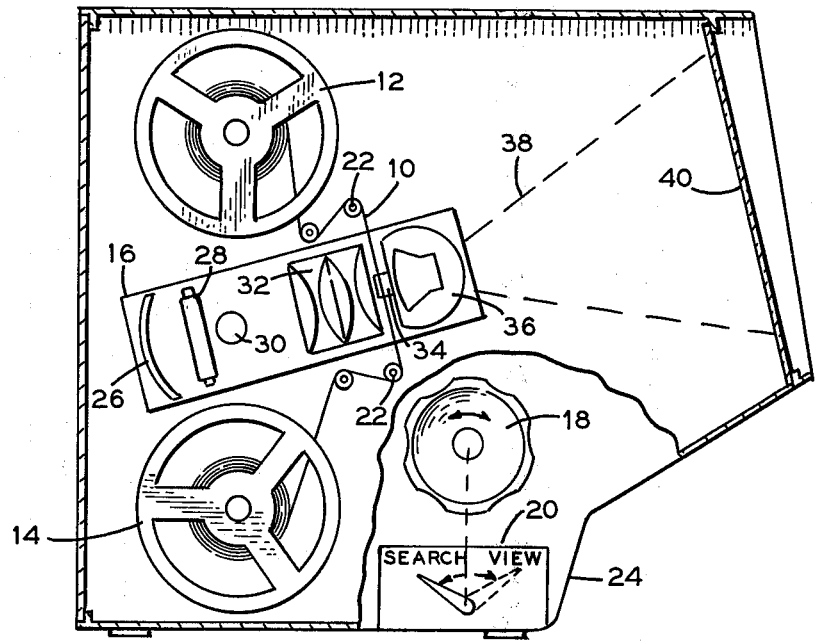
FIG. 1 is a diagrammatic side elevation of a projection apparatus showing the relationship of the film and projection optics.

Referring to FIG. 1, the film 10 is stored in a storage reel 12 and taken up on a take up reel 14. The film is run through the optical system, illustrated generally as 16, by either manual or motor driven operation. Since motor drive is the preferred mode of operation, the use of the system herein shall be described in conjunction with a motor driven system although it will be understood that the system can be employed with manual feed.

With motor drive, a control knob 18 provides a first portion of the film control means, the second portion of which includes a search/view control 20. The control knob 18 is employed as a forward and reverse variable motor speed control, whereas the search/view control 20 provides a search mode energizing the flash circuitry for searching through indices, and a view mode energizing the projection lamp for viewing the frame data.

The film 10 is entrained over conventional guide rollers 22 and threaded through the optical system 16 which is fixedly mounted to the cabinet 24.

The optical system 16 includes a reflector 26, a strobe lamp 28, a projection lamp 30, a condenser lens 32, an optical switch 34, and a viewing lens 36. The projected image 38 is projected on a mat screen 40.

Figure 2:
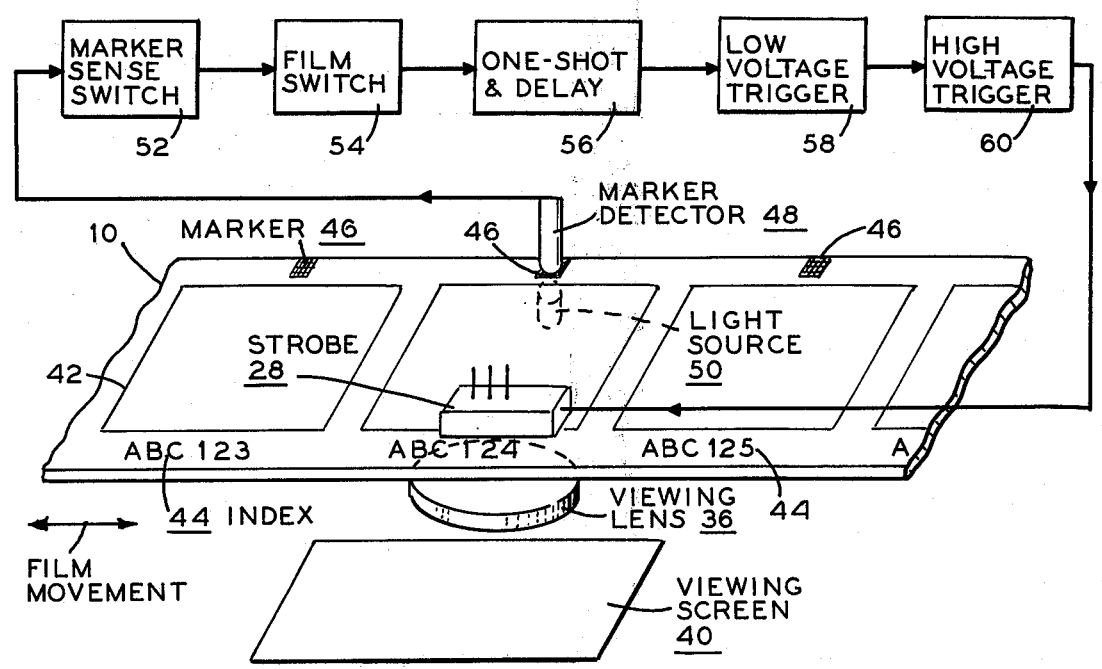
FIG. 2 is a block diagram of the electronic system employed with a pre-recorded indexed frame of a series of frames.

Referring to FIG. 2, the index projection system is illustrated in greater detail. The film 10 is divided into a plurality of frames 42, each including a unique index number 44. It is noted that the index numbers are alpha-numerically assigned, with a units digit variation occurring between frames. It will be understood that the frame index designations may vary and that other indexing schemes may be employed as will be apparent from the following description.

Positioned on an edge of the film, with each frame, is a marker 46. The position of the marker 46 is detected by means of the optical switch 34 (FIG. 1) which includes a marker detector 48 and a light source 50, positioned on respectively opposite sides of the film 10, and a marker sense switch 52. Although shown as a dark marker against a transparent background, it is of course understood that a negative system may be employed, with a transparent marker against a dark background. To enable the system to handle either occurrence, a film switch 54 is provided for selectively inverting the marker sense switch output.

The output of the film switch 54 is coupled to a one-shot and delay circuit 56 which will provide a trigger pulse, in accordance with a minimum delay period, to the low voltage trigger 58. The low voltage trigger 58 is used to drive a high voltage trigger 60, which in turn drives the strobe lamp 28. The marker sense switch 52, the film switch 54, the one-shot and delay circuit 56, and the low and high voltage triggers 58 and 60 comprise the electronic control means 61. Thus, the electronic control means 61 is responsive to a marker 46 to operate the strobe 28 via the optical switch 34 (FIG. 1) which comprises the marker detector 48 and the light source 50.

The strobe lamp 28 is positioned so as to provide maximum light to the index number 44 area, thus projecting the index number 44 through the viewing lens 36 to the viewing screen 40. Since the flash of the strobe 28 will occur in timed relationship to a frame, the repeated projection of the index numbers 44 will give the appearance of a still projection although the frames continue to move at a rapid rate.

The operation of the system is therefore based upon the sequence of frame index projections. At a high rate of movement, each frame index projection will overlay the prior frame index projection and be optically integrated by the eye of the viewer such that the least significant digit or digits will appear blurred. For example, using the index 44, if a film includes 20 frames per foot, and the film is moving at 400 feet per minute, the digit in the most significant digit position, here the character A, will change every 5,070 seconds, the next most significant (character B) every 195 seconds, the next most significant (character C) every 7.5 seconds, and the next most significant (1) every 0.75 seconds. The remaining digits change more rapidly in proportion. It has been found that a change level of about 0.6 seconds is readable by the human eye. Thus, once the first four digit portions are read in accordance with a desired index to be retrieved, the film can begin to be slowed, as by rotation of speed control knob 18. At 50 feet per minute, the fourth digit position (character 1) requires 6 seconds to change, while the fifth digit position requires 0.6 seconds to change, thus becoming readable. At 5 feet per minute, the fifth digit position (character 2) requires 6.0 seconds to change, and the last or least significant digit requires 0.6 seconds to change, thus becoming readable. The film can now be stopped at the desired index, and viewed.

The one shot 56 functions to insure the trigger circuits 58 and 60 get one pulse per marker and that that pulse is uniform with respect to its pulse width and is independent of the speed that the marker may be moving past the optical switch 34. The delay 78 establishes a maximum flash rate. For example, if the delay is set for 20 milliseconds, then at high speeds there will be a 20 millisecond delay between flashes or a maximum flash rate of 50 flashes per second. If the feed rate is 100 frames per second, then every other frame will be flashed. As is evident from the foregoing, flashing every other frame at that speed will not affect the visual resolution of index numbers. At higher film speeds, fewer marker signals are operative to activate the strobe lamp 28 since marker signals which trigger the one shot 76 also activate the delay 78 which in turn inhibits the one shot 76 from being triggered for 20 milliseconds. Thus, the faster the film speed, the more intervening markers there are which do not produce a flash.

It is possible to flash every frame by not using a delay 78 but there is no advantage to flash at a rate faster than 50 frames per second; and by not flashing every frame at a high speed, the life of the strobe is increased.

The marker detector 48, light source 50 and marker sense switch 52 are contained within the optical switch 34 which, as shown in FIGS. 1 and 2, includes a notched portion containing the beam of light between the light source 50 and the marker detector 48 and through which the film 10 passes with an edgewise relationship for marker detection. The sensitivity of the optical switch 34, (FIG. 3) may be adjusted by means of a sensitivity adjusting resistor R1 which is biased by a potential $V_{cc}$. The optical switch 34 may be a commercially available unit consisting of an infra-red light emitting diode activating a photo-transistor across an air spacer gap, together with a Schmitt trigger circuit. When the light beam is interrupted, as by the marker 46, the output of the optical switch 34 changes. Such a unit is commercially available from the HEI Company, Chaska, Minn., as Optical Switch No. OS-591S-060LW.

The film switch 54 consists of an inverter 72, the input to which is controlled by means of switch 74 for positive or negative film. The resistance R2 serves as a biasing resistor for the optical switch 34 to prevent oscillation of optical switch 34 at low speeds. The resistance R3 serves as a dropping resistor for the inverter 72 or one-shot 76, depending on the position of switch 74.

The one-shot and delay circuit 56 is coupled from the output of the inverter 72 and includes a monostable multivibrator or one-shot pulse generator 76 which, as shown, is set at 50 microseconds but which may be variable by means of an adjustable resistor therein. Coupled to the one-shot pulse generator 76 is a 20 millisecond delay timer 78, the operation of which is to delay or inhibit refiring of the one-shot for the delay period preset by the delay unit 78. The delay unit 78 may also be adjustable by means of a variable resistance as shown. The 50 microsecond and 20 millisecond time periods, of course, may be varied and are cited as exemplary only and not intended to be limiting. The output of the one-shot pulse generator 76 is fed to a low voltage trigger 58 which, as shown, consists of a conventional two transistor switch and appropriate biasing resistances for applying a trigger potential to the gate electrode of the SCR 79. The firing of the high voltage trigger 60 by the low voltage trigger 58 will couple the previously stored potential on the capacitor C1 into the high voltage trigger circuit 80 for firing the flash tube or strobe lamp 28.

The flash tube or strobe lamp 28 may be a 1CP3 type available from the U.S. Scientific Instruments Co. of Watertown, Mass., and a suitable high voltage trigger circuit 60 for firing the flash tube is disclosed in U.S. Pat. No. 3,355,625. Other suitable triggerable light sources may be used, such as a keyed laser.

The remaining components, by way of example, may have the following component values, it being understood that such values are presented as exemplary and not intended to be limiting:

| | | |
|---|---|---|
| $V_{cc}$—5v | $R_7$ —100 ohms | $C_1$ —0.27 uf |
| $R_1$ —200 ohms | $R_8$ —10K ohms | $C_2$ —0.5 uf (1000 VDC) |
| $R_2$ —100 ohms | $R_9$ —1K ohms | $C_3$ —1 uf |
| $R_3$ —2.2K ohms | $R_{10}$—1K ohms | $C_4$ —25 uf |
| $R_4$ —10K ohms | $R_{11}$—1K ohms | $IC_1$—SN7402N |
| $R_5$ —1K ohms | $R_{12}$—1K ohms | $Q_1$ —TIS92 |
| $R_6$ —10K ohms | $R_{13}$—1K ohms | $Q_2$ —TIS93 |

SCR79 - 2N4187
One-Shot & Delay 56 - SN74121N
Delay 78 - SN74121N

Referring to FIG. 4, a generalized schematic of the manner wherein information is applied to the film is set forth in some detail for computer generated film. As shown, a tape unit 100 is provided with a computer tape 102 containing thereon the electronic digital information to be recorded on the film on a per frame basis together with the associated frame indexes. The digital information and indexes are fed through a central processor unit 104 to the cathode ray tube display 106. Alternatively, the CPU104 can be preset to respond to each frame of information applied thereto for internally generating a sequence of index numbers corresponding to those particular frames. The index numbers are recorded on one edge of the film by means of the CRT display 106. The frame information is also generated on the face of CRT display 106 and projected through a mask 108 onto an optical lens arrangement 110. The mask 108 includes a marker image 112 positioned on the mask so as to be preferably located on the opposite edge of the film than the index when projected through the optical lens 110. The film is contained inside a suitable exposure device 114 and is fed on a frame by frame basis to be exposed to the images applied from the CRT106. The index and its associated marker should be juxtaposed in such a manner that when the marker causes the strobe to be fired the entire index is displayed within the confines of the viewing screen 40. The use of the mask 108 and marker image 112 need not be done simultaneously with exposure of the data from the computer tape but is done before the film is advanced to the next frame. In order to avoid jitter of the index numbers on the screen, it is necessary that each marker be positioned with respect to its associated index in a constant relationship. This enables the strobe to be fired with regard to each successive index thereby preventing any misregistration in the index overlays, which would occur to the eye as a jitter effect.

Alternatively, markers 46 may be recorded using a bulb positioned adjacent the unexposed film and operated at the correct time under control of the CPU104.

In the case of filming from paper, the marker and index numbers would be assigned and recorded at the time of exposure of the paper document.

The indexes 44 are computer generated in accordance with known techniques. In the past markers, such as markers 46, have been used to decrement or increment a counter preset to a given number to cause the film to move that given number of frames from or to the preset number, starting with the frame showing when the counter is preset.

It is novel, however, to use markers in a constant relationship with associated indexes to operate a triggerable light source to display the index when the microfilm is moving, especially at high search speeds and especially when the index is recorded adjacent to the data frame.

In the microfilm projection apparatus shown in FIG. 1, the indexes are displayed on viewing screen 40. However, the indexes could be displayed on a separate screen of an attachment to a conventional microfilm viewer. In that embodiment of the invention the film 10 is fed outside of the microfilm viewer housing, through the attachment and then back into the housing to the optical system 16. The attachment would essentially comprise all of the apparatus of FIG. 2 except that the index viewing screen would be mounted on the attachment. When the indexes are originally recorded, an adjustment would be made for the number of frames between the frame with the index being displayed on the attachment screen and the frame being projected on the viewing screen 40 so that the index being displayed on the attachment screen corresponded with the frame being displayed on the viewing screen 40.

Alternatively, the apparatus of FIG. 2 could be sold separate from the microfilm viewer with the intent of converting an existing viewer to incorporate the invention. In that case the indexes would be displayed on the microfilm viewing screen, and the existing optical system or a separate index display optical system could be used.

Thus, what has been described is a novel and unique electronic system for displaying a plurality of continuously moving frames onto a single screen wherein a rapidly changing index number allows operator retrieval at high speeds.

What is claimed is:

1. A microfilm searching system comprising:
   a. microfilm moving means for rapidly moving sprocketless microfilm from one reel to another;
   b. microfilm projecting means mounted in the film path between the reels and near to the sprocketless microfilm for clearly displaying a desired frame on a viewing screen when the microfilm is stopped;
   c. an optically displayable index, comprising a plurality of characters, on each of a plurality of frames of the sprocketless microfilm;
   d. an optically detectable marker on each of said plurality of frames of the sprocketless microfilm;
   e. triggerable light source means mounted in the film path between the reels and near the sprocketless microfilm for optically displaying as a stationary picture, when triggered, at least one character of an optically displayable index on a passing frame;
   f. electronic control means optically responsive to an optically detectable marker on a passing frame for triggering said triggerable light source means so that at least one character of the optically displayable index on that passing frame may be read by a human reader; and
   g. film control means adapted to be operated by a human reader for slowing the movement of the sprocketless microfilm so that more of the characters of the optically displayable index on a passing frame may be read and for stopping the microfilm when the desired frame is located and projectable on the viewing screen.

2. The microfilm searching system of claim 1 wherein said electronic control means is only optically responsive to an optically detectable marker which occurs more than a given period of time after the preceding triggering marker, so that intervening markers do not trigger said triggerable light source means.

3. The microfilm searching system of claim 2 wherein said electronic control means comprises one-shot and delay means which produce, when set, a triggering signal in response to a detected marker and does not reset until after said given period of time so that intervening markers cannot set said one-shot and delay means.

4. The microfilm searching system of claim 1 wherein said electronic control means comprises:
 a. optical switch means for generating a marker signal when a marker is detected;
 b. one-shot and delay means responsive to a marker signal for generating a triggering signal; and
 c. trigger means responsive to a triggering signal for generating a trigger pulse for triggering said triggerable light source means.

5. The microfilm searching system of claim 4 wherein said one-shot and delay means when set by a marker signal does not reset for a given period of time so that subsequent marker signals detected during said given period of time do not trigger said triggerable light source means.

6. The microfilm searching system of claim 1 wherein the index is displayed on the viewing screen associated with the microfilm projecting means.

7. The microfilm searching system of claim 1 further comprising an index display means separate from the viewing screen associated with the microfilm projecting means, and wherein said index is displayed on said index display means.

8. A microfilm searching system comprising:
 a. microfilm moving means for rapidly moving microfilm from one reel to another;
 b. microfilm projecting means mounted in the film path between the reels and near to the microfilm for clearly displaying a desired frame on a viewing screen when the microfilm movement is stopped;
 c. an optically displayable index, comprising a plurality of characters, on each of a plurality of frames of the microfilm;
 d. a detectable marker on each of said plurality of frames of the microfilm;
 e. triggerable light source means mounted in the film path between the reels and near the microfilm for optically displaying as a stationary picture, when triggered, at least one character of an index on a passing frame;
 f. electronic control means responsive to a detectable marker on a passing frame for triggering said triggerable light source means so that at least one character of the index on that passing frame may be read by a human reader;
 g. film control means adapted to be operated by a human reader for slowing the movement of the microfilm so that more of the characters of the index on a passing frame may be read and for stopping the microfilm when the desired frame is located and projectable on the viewing screen; and
 h. said electronic control means being only responsive to a marker which occurs more than a given period of time after the preceding triggering marker, said given period of time being in the order of 20 milliseconds, so that intervening markers not trigger said triggerable light source means.

9. A microfilm searching system comprising:
 a. microfilm moving means for rapidly moving microfilm from one reel to another;
 b. microfilm projecting means mounted in the film path between the reels and near to the microfilm for clearly displaying a desired frame on a viewing screen when the microfilm movement is stopped;
 c. an optically displayable index, comprising a plurality of characters, on each of a plurality of frames of the microfilm;
 d. a detectable marker on each of said plurality of frames of the microfilm;
 e. triggerable light source means mounted in the film path between the reels and near the microfilm for optically displaying as a stationary picture, when triggered, at least one character of an index on a passing frame;
 f. electronic control means responsive to a detectable marker on a passing frame for triggering said triggerable light source means so that at least one character of the index on that passing frame may be read by a human reader;
 g. film control means adapted to be operated by a human reader for slowing the movement of the microfilm so that more of the characters of the index on a passing frame may be read and for stopping the microfilm when the desired frame is located and projectable on the viewing screen;
 h. said electronic control means comprising:
  i. optical switch means for generating a marker signal when a marker is detected;
  ii. one-shot & delay means responsive to a marker signal for generating a triggering signal; and
  iii. trigger means responsive to a triggering signal for generating a trigger pulse for triggering said triggerable light source means;
 i. said one-shot & delay means when set by a marker signal not resetting for a given period of time so that subsequent marker signals detected during said given period of time do not trigger such triggerable light souce means;
 j. said given period of time being about 20 microseconds.

10. A microfilm searching system comprising:
 a. microfilm moving means for rapidly moving microfilm from one reel to another;
 b. microfilm projecting means mounted in the film path between the reels and near to the microfilm for clearly displaying a desired frame on a viewing screen when the microfilm movement is stopped;
 c. an optically displayable index, comprising a plurality of characters, on each of a plurality of frames of the microfilm;
 d. a detectable marker on each of said plurality of frames of the microfilm;
 e. triggerable light source means mounted in the film path between the reels and near the microfilm for optically displaying as a stationary picture, when triggered, at least one character of an index on a passing frame;
 f. electronic control means responsive to a detectable marker on a passing frame for triggering said triggerable light source means so that at least one character of the index on that passing frame may be read by a human reader;
 g. film control means adapted to be operated by a human reader for slowing the movement of the microfilm so that more of the characters of the index on a passing frame may be read and for stopping the microfilm when the desired frame is located and projectable on the viewing screen;
h. said electronic control means comprising:
  i. optical switch means for generating a marker signal when a marker is detected;
  ii. one-shot & delay means responsive to a marker signal for generating a triggering signal; and
  iii. trigger means responsive to a triggering signal for generating a trigger pulse for triggering said triggerable light source means;
i. said microfilm searching system further comprising film switch means, connected between said optical switch means and one-shot & delay means, for changing the polarity of the triggering signal to correspond with positive or negative microfilm.

11. A film searching system for searching nonsprocketed film comprising:
a. moving means for moving nonsprocketed film;
b. projecting means for clearly displaying a desired frame on a viewing screen when the film movement is stopped;
c. an optically displayable index, comprising a plurality of characters, on each of a plurality of frames of the nonsprocketed film;
d. a nonmechanically detectable marker on each of said plurality of frames of the nonsprocketed film;
e. triggerable light source means for optically displaying as a stationary picture, when triggered, at least one character of an optically displayable index on a passing frame;
f. first control means responsive to a nonmechanically detectable marker on a passing frame for triggering said triggerable light source means so that at least one character on that passing frame may be read; and
g. second control means for stopping the nonsprocketed film when the desired frame is located and projected on the viewing screen.

12. The film searching system of claim 11 wherein said second control means includes means for slowing the film so that more of the characters of the index on a passing frame may be read.

13. The film searching system of claim 12 wherein said second control means is adapted to be operated by a human reader.

14. For combination with a microfilm viewer apparatus having microfilm viewing means for rapidly moving sprocketless microfilm from one reel to another and microfilm projecting means mounted in the film path between the reels and near to the microfilm for clearly displaying a desired frame on a viewing screen when the microfilm movement is stopped, said sprocketless microfilm having an optically displayable index, comprising a plurality of characters, and an optically detectable marker on each of a plurality of frames, an attachment comprising:
a. triggerable light source means mounted in the film path between the reels and near the sprocketless microfilm for optically displaying as a stationary picture, when triggered, at least one character of an optically displayable index on a passing frame; and
b. electronic control means optically responsive to an optically detectable marker on a passing frame for triggering said triggerable light source means so that at least one character of the optically displayable index on that passing frame may be read by a human reader.

15. The attachment of claim 14 wherein said index is optically displayed on the viewing screen of the microfilm viewer.

16. The attachment of claim 14 further comprising an index display screen separate from the viewing screen and wherein said index is optically displayed on said index display screen.

17. A microfilm searching system for searching nonsprocketed microfilm having an optically displayable index, comprising a plurality of characters, and an optically detectable marker on each of a plurality of frames of the microfilm, said system comprising:
a. microfilm moving means for rapidly moving nonsprocketed microfilm from one reel to another;
b. microfilm projecting means mounted in the film path between the reels and near to the nonsprocketed microfilm for clearly displaying a desired frame on a viewing screen when the microfilm movement is stopped;
c. triggerable light source means mounted in the film path between the reels and near the microfilm for optically displaying as a stationary picture, when triggered, at least one character of an optically displayable index on a passing frame;
d. electronic control means optically responsive to an optically detectable marker on a passing frame for triggering said triggerable light source means so that at least one character of the optically displayable index on that passing frame may be read by a human reader; and
e. film control means adapted to be operated by a human reader for slowing the movement of the nonsprocketed microfilm so that more of the characters of the index on a passing frame may be read and for stopping the microfilm when the desired frame is located and projectable on the viewing screen.

* * * * *